(12) United States Patent
Onimatsu

(10) Patent No.: US 9,902,097 B2
(45) Date of Patent: Feb. 27, 2018

(54) RUBBER STRIP MANUFACTURING DEVICE AND MANUFACTURING METHOD

(71) Applicant: Sumitomo Rubber Industries, Ltd., Kobe-shi, Hyogo (JP)

(72) Inventor: Hiroyuki Onimatsu, Kobe (JP)

(73) Assignee: SUMITOMO RUBBER INDUSTRIES LTD., Kobe-shi, Hyogo (JP)

( * ) Notice: Subject to any disclaimer, the term of this patent is extended or adjusted under 35 U.S.C. 154(b) by 349 days.

(21) Appl. No.: 14/422,769

(22) PCT Filed: Aug. 30, 2013

(86) PCT No.: PCT/JP2013/073402
§ 371 (c)(1),
(2) Date: Feb. 20, 2015

(87) PCT Pub. No.: WO2014/042021
PCT Pub. Date: Mar. 20, 2014

(65) Prior Publication Data
US 2015/0231804 A1    Aug. 20, 2015

(30) Foreign Application Priority Data
Sep. 14, 2012   (JP) .................................. 2012-203240

(51) Int. Cl.
*B29C 47/92*   (2006.01)
*B29C 43/58*   (2006.01)
(Continued)

(52) U.S. Cl.
CPC .............. *B29C 43/24* (2013.01); *B29C 43/58* (2013.01); *B29C 47/004* (2013.01);
(Continued)

(58) Field of Classification Search
CPC . B29C 47/004; B29C 47/0813; B29C 47/364; B29C 47/906; B29C 47/92;
(Continued)

(56) References Cited

U.S. PATENT DOCUMENTS

| | | |
|---|---|---|
| 5,135,827 A | 8/1992 | Bohm et al. |
| 5,158,724 A | 10/1992 | Yagi et al. |

(Continued)

FOREIGN PATENT DOCUMENTS

| | | |
|---|---|---|
| EP | 0429161 A1 | 5/1991 |
| EP | 0968814 A2 | 1/2000 |

(Continued)

OTHER PUBLICATIONS

International Search Report, issued in PCT/JP2013/073402, dated Dec. 3, 2013.

(Continued)

*Primary Examiner* — James P Mackey
(74) *Attorney, Agent, or Firm* — Birch, Stewart, Kolasch & Birch, LLP

(57) ABSTRACT

Provide a manufacturing method and a manufacturing device for a rubber strip capable of stably manufacturing a tape-like rubber strip of unvulcanized rubber. The rubber strip manufacturing device (1) for manufacturing a tape-like rubber strip (G2) made of unvulcanized rubber is characterized in including: a rubber extruder (3) comprising a rubber extruder main body (6) having a screw shaft (6c) for kneading and pushing the unvulcanized rubber toward an outlet opening (6d), and a gear pump (7) connected to the outlet opening (6d) of the rubber extruder main body (6) and rotary-driven by a first motor (M1); a calender head (4) comprising a pair of calender rollers (4a,4b) for rolling a shaped rubber body extruded from the rubber extruder (3) to obtain the rubber strip (G2); and a control unit (70) for (Continued)

controlling a second motor (M2) for rotary-driving the calender rollers in conjunction with the first motor (M1).

4 Claims, 9 Drawing Sheets

(51) Int. Cl.
*B29C 43/24* (2006.01)
*B29K 21/00* (2006.01)
*B29L 7/00* (2006.01)
*B29C 47/00* (2006.01)
*B29C 47/08* (2006.01)
*B29C 47/90* (2006.01)
*B29C 47/36* (2006.01)

(52) U.S. Cl.
CPC ........ *B29C 47/0813* (2013.01); *B29C 47/364* (2013.01); *B29C 47/906* (2013.01); *B29C 2043/5875* (2013.01); *B29C 2947/92885* (2013.01); *B29C 2947/92923* (2013.01); *B29C 2947/92933* (2013.01); *B29K 2021/00* (2013.01); *B29L 2007/008* (2013.01)

(58) Field of Classification Search
CPC ........... B29C 2947/92885; B29C 2947/92923; B29C 2947/92933
See application file for complete search history.

(56) References Cited

U.S. PATENT DOCUMENTS

| 6,372,070 | B1 | 4/2002 | Iizuka et al. |
| 2006/0021692 | A1 | 2/2006 | Miki |
| 2006/0057243 | A1 | 3/2006 | Hayashi et al. |
| 2007/0045885 | A1* | 3/2007 | Mizunuma ............ B29C 43/245 264/40.1 |
| 2007/0126144 | A1 | 6/2007 | Jin et al. |
| 2009/0283203 | A1* | 11/2009 | Marchini ............... B29C 43/224 156/117 |
| 2012/0313287 | A1* | 12/2012 | Nakamura .......... B29C 47/0876 264/175 |

FOREIGN PATENT DOCUMENTS

| EP | 1486320 | A1 | 12/2004 |
| EP | 2532505 | A1 | 12/2012 |
| JP | 3-161315 | A | 7/1991 |
| JP | 4-214321 | A | 8/1992 |
| JP | 2000-79642 | A | 3/2000 |
| JP | 2003-266555 | A | 9/2003 |
| JP | 2006-43908 | A | 2/2006 |
| JP | 2006-82277 | A | 3/2006 |
| JP | 2008-126497 | A | 6/2008 |
| JP | 2009-518195 | A | 5/2009 |
| JP | 2009-137034 | A | 6/2009 |

OTHER PUBLICATIONS

Extended European Search Report, dated Apr. 28, 2016, for European Application No. 13837883.1.

* cited by examiner

RUBBER STRIP MANUFACTURING DEVICE AND MANUFACTURING METHOD

TECHNICAL FIELD

The present invention relates to a manufacturing method and a manufacturing device for a rubber strip capable of stably manufacturing a tape-like rubber strip of unvulcanized rubber.

BACKGROUND OF THE INVENTION

As a method for forming a raw cover (green tire) for a pneumatic tire or its rubber member, a strip winding method is known. As shown in FIG. 9, in the strip winding method, rubber continuously extruded from a rubber extruder (a) is rolled by calender rollers (b). Thereby, a tape-like unvulcanized rubber strip (c) is formed. The rubber strip (c) is supplied to a rubber applicator (f), for example via a festoon (e). The rubber applicator (f) overlap-winds the rubber strip (c) continuously on a winding-around body (g), e.g. a cylindrical former or the like. Thereby, on the outside of the winding-around body (g), an annular rubber member (for example, a tread rubber or a sidewall rubber) is formed.

In the strip winding method, by changing a winding pitch of the rubber strip (c), it is possible to manufacture rubber members having various cross-sectional shapes. Therefore, the strip winding method has high versatility. The strip winding method does not need any stock of rubber members, and it can improve the productivity.

Patent Document 1: Japanese Unexamined Patent Application Publication No. 2006-43908
Patent Document 2: Japanese Unexamined Patent Application Publication No. 2006-82277

DISCLOSURE OF THE INVENTION

Problems to be Solved by the Invention

By the way, it is necessary for forming a rubber member with a high accuracy that the rubber strip (c) having a constant cross-sectional shape is manufactured continuously and supplied to the rubber applicator (f).

It is however, difficult for the conventional rubber extruder (a), which is a screw type, to extrude the rubber stably. Specifically, in start-up period of the rubber extruder (a), the discharge rate of the rubber is unstable. Thus, there is a problem that the width of the rubber strip (c) rolled by the calender rollers (b) becomes unstable.

In order to solve the above-mentioned problem, a method is conceivable which detects the width of the rubber strip (c) on a downstream-side of the calender rollers (b), and controls the rotational speed of the calender rollers (b) based on the width of the rubber strip (c). In such method, however, the adjustment of the width of the rubber strip (c) is liable to delay, and it is difficult to stably manufacture the rubber strip (c).

The present invention has an objective of providing a device and a method for manufacturing a rubber strip which are capable of solving the above-mentioned problems and the like.

Means for Solving the Problem

In the invention of claim 1 among the present inventions, a rubber strip manufacturing device which is a device to manufacture a tape-like rubber strip made of unvulcanized rubber, and which is characterized by including a rubber extruder comprising a rubber extruder main body having a screw shaft for kneading and pushing the unvulcanized rubber toward an outlet opening, and a gear pump connected to the outlet opening of the rubber extruder main body and rotary-driven by a first motor; a calender head comprising a pair of calender rollers for rolling a shaped rubber body extruded from the rubber extruder to obtain the rubber strip; and a control unit for controlling a second motor for rotary-driving the calender rollers in conjunction with the first motor.

The control unit controls the rotational speed of the second motor based on the rotational speed of the first motor.

On a downstream-side of the calender head, a pulling roll for pulling the rubber strip rolled by the calender rollers is provided, and the control unit controls a third motor for rotary-driving the pulling roll in conjunction with the first motor.

A rubber strip manufacturing method which is a method for manufacturing a tape-like rubber strip made of unvulcanized rubber, and which is characterized by including an extruding step to extrude a long tape-like shaped rubber body of the unvulcanized rubber by use of a rubber extruder comprising a rubber extruder main body having a screw shaft for kneading and pushing the unvulcanized rubber toward an outlet opening, and a gear pump connected to the outlet opening of the rubber extruder main body and rotary-driven by a first motor, and a rolling step to roll the shaped rubber body with the calender rollers so as to form the rubber strip, wherein, in the rolling step, a second motor for rotary-driving the calender rollers is controlled in conjunction with the first motor.

The invention of claim 5 relates to the rubber strip manufacturing method as set forth in claim 4. In the rolling step, the rotational speed of the second motor is controlled based on the rotational speed of the first motor.

The pulling step to pull the rubber strip rolled by the calender rollers by use of a pulling roll disposed on a downstream-side of the calender head, and in the pulling step, a third motor for rotary-driving the pulling roll is controlled in conjunction with the first motor.

Effect of the Invention

The manufacturing device and the manufacturing method for a rubber strip according to the present invention has the rubber extruder. The rubber extruder has the rubber extruder main body having the screw shaft, and the gear pump connected to the outlet opening of the rubber extruder main body. The gear pump can extrude rubber by a fixed quantity more stably in comparison with a screw type extruder. Therefore, the rubber extruder can continuously extrude a shaped rubber body having stable dimensions and supply it to the calender rollers. Moreover, in the present invention, the second motor which rotary-drives the calender rollers is controlled in conjunction with the first motor which rotary-drives the gear pump. Therefore, the dimensions of the rubber strip rolled by the calender rollers become stable, and consequently, it is possible to finish the green tire or its rubber member with accuracy.

EXPLANATION OF THE REFERENCE

Figure 1:
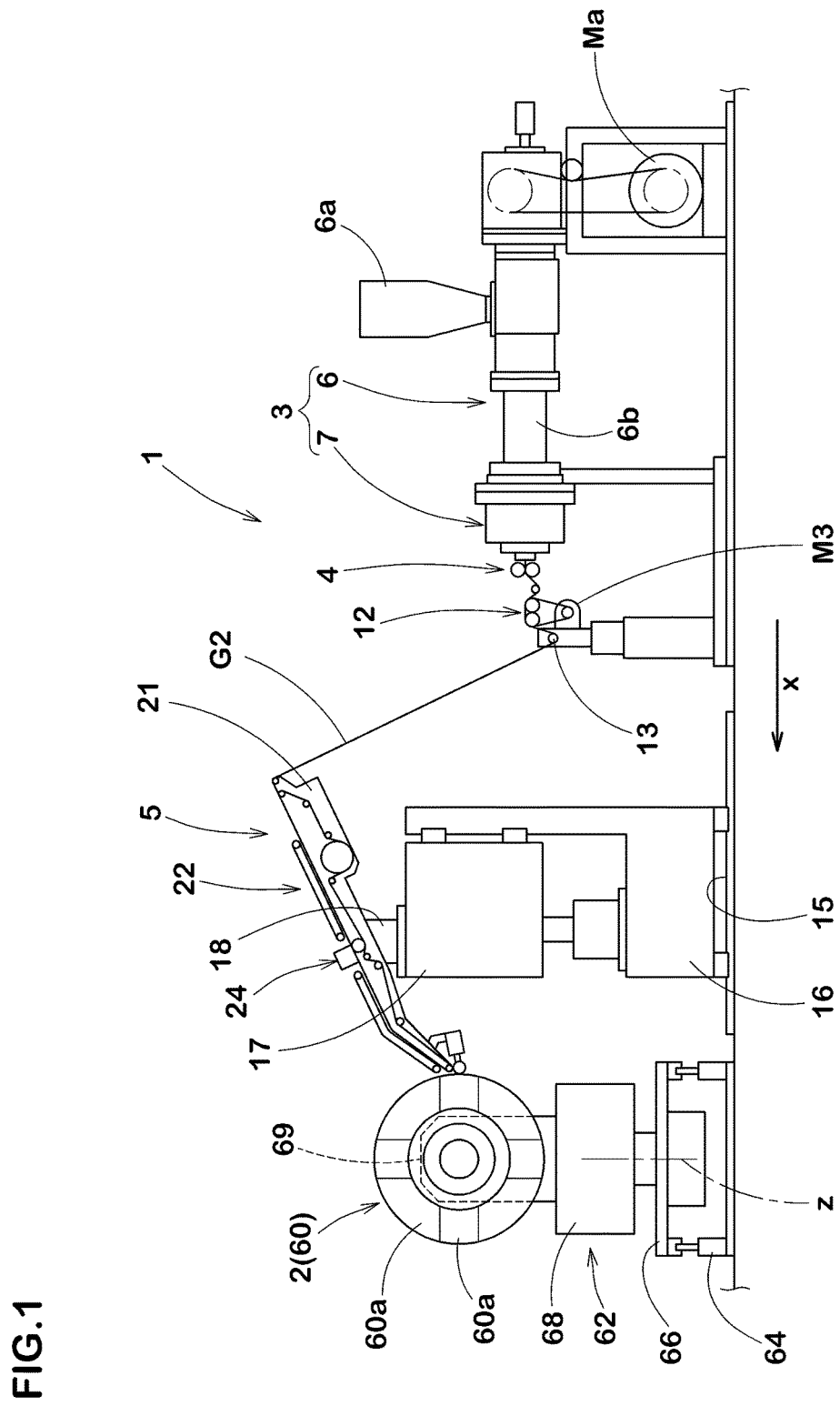
FIG. 1 is an overall side view of a rubber member manufacturing device showing an embodiment of the present invention.

1 Rubber strip manufacturing device
2 winding-around body
3 Rubber extruder
4 Calender head
5 Rubber applicator
6 Rubber extruder main body
6b screw shaft
7 Gear pump
12 Pulling roll
70 Control unit
G1 Rubber body
G2 Rubber strip
M1 First motor
M2 Second motor
M3 Third motor

BEST MODE FOR CARRYING OUT THE INVENTION

Hereinafter, an embodiment of the present invention will be described with referent to the drawings.

As shown in FIG. 1, the manufacturing device 1 for a rubber strip in the present embodiment continuously manufactures a tape-like rubber strip G2 made of unvulcanized rubber.

The manufacturing device 1 in the present embodiment has a rubber extruder 3, a calender head 4a, and pulling rolls 12. The pulling rolls 12 are provided for pulling the rubber strip G2 disposed on a downstream-side of the calender head 4.

Figure 2:
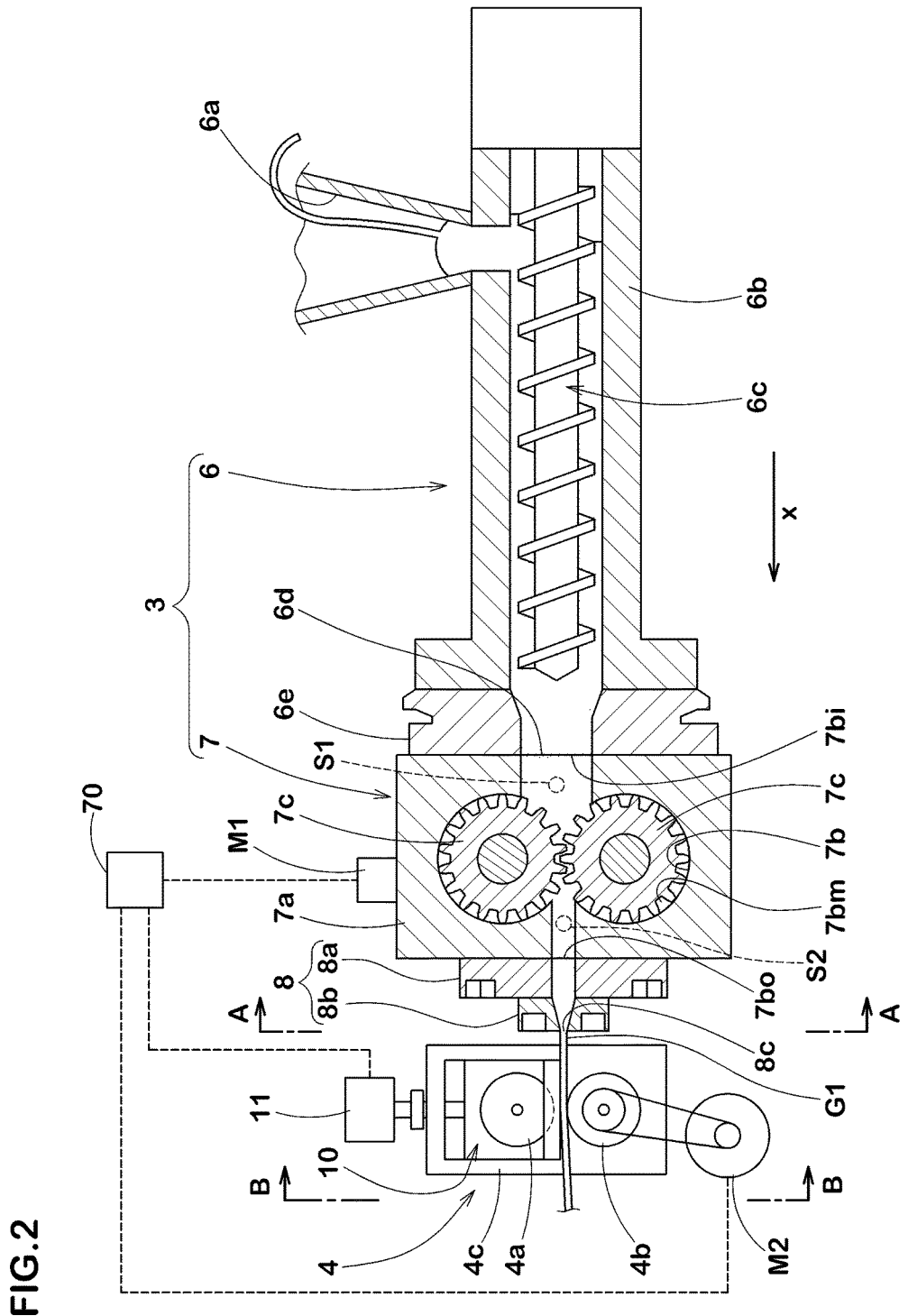
FIG. 2 is a partially enlarged view of a rubber-extruding unit of FIG. 1.

FIG. 2 is a partially enlarged view of the rubber extruder 3. The rubber extruder 3 has a rubber extruder main body 6 and a gear pump 7.

The rubber extruder main body 6 has a cylinder 6b, a screw shaft 6c, and an extrusion head 6e. The cylinder 6b is substantially cylindrical. The cylinder 6b is provided on its one end side with an input opening 6a through which the unvulcanized rubber members and various compounding agents are thrown in. The screw shaft 6c is housed in the cylinder 6b. The screw shaft 6c is rotary-driven by a motor Ma with reduction gears (shown in FIG. 1). The extrusion head 6e is provided with an outlet opening 6d to extrude the unvulcanized rubber pushed ahead by the screw shaft 6c.

The gear pump 7 is connected to the outlet opening 6d of the rubber extruder main body 6 and composed as a constant-volume type extruding pump. The gear pump 7 has a casing 7a, a rubber chamber 7b formed inside the casing 7a, and a pair of extrusion gears 7c engaging one another inside the rubber chamber 7b.

The rubber chamber 7b has an inlet port 7bi disposed on an upstream-side of the rubber extruding direction (x) (hereinafter so-called simply an "upstream-side"), and an outlet port 7bo disposed on a downstream-side of the rubber extruding direction (x) (hereinafter so-called simply a "downstream-side"). Moreover, the rubber chamber 7b is positioned between the inlet port 7bi and the outlet port 7bo and has a gear storage space 7bm for housing the extrusion gear 7c.

The inlet port 7bi of the rubber chamber 7b is communicated with the outlet opening 6d of the rubber extruder main body 6. Therefore, the unvulcanized rubber force-fed by the rubber extruder main body 6 is supplied into the rubber chamber 7b through the inlet port 7bi.

The extrusion gear 7c is rotary-driven by a first motor M1. Thereby, the rubber member flowed from the inlet port 7bi to the rubber chamber 7b is filled in a tooth groove of the rolling extrusion gear 7c, and force-fed quantitatively to the outlet port 7bo side.

The gear pump 7 has a pressure sensor S1 which can detect a rubber pressure on the inlet port 7bi side of the rubber chamber 7b, and a pressure sensor S2 which can detect a rubber pressure on outlet port 7bo side of the rubber chamber 7b. In the present embodiment, the motor Ma with reduction gears (shown in FIG. 1) of the rubber extruder main body 6 is rotation-controlled so that the rubber pressure on the inlet port 7bi side of the rubber chamber 7b keeps constant. The control is operated in a control unit 70.

The outlet port 7bo of the rubber chamber 7b is connected with a extrusion head 8. The extrusion head 8 has a head main body 8a, and a nozzle die 8b with an opening 8c. The head main body 8a is formed to have a block-like shape and fixed exchangeably on the downstream-side of the casing 7a of the gear pump 7. And the nozzle die 8b is attached exchangeably to the head main body 8a. The rubber member which force-fed from the outlet port 7bo of the rubber chamber 7b is extruded as a tape-like rubber body G1 preformed by the opening 8c of the extrusion head 8.

Figure 3A:
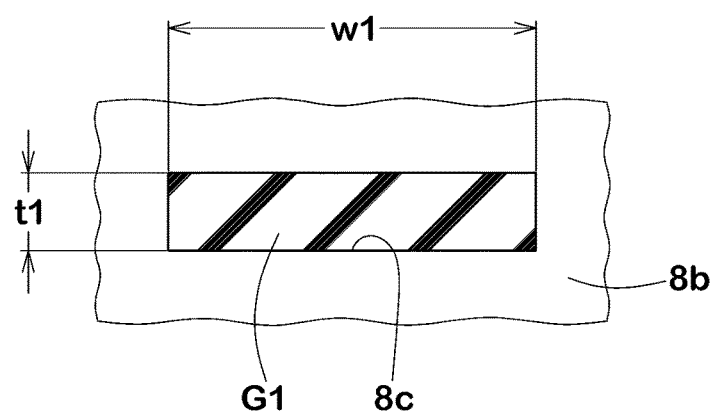
FIG. 3(A) is a cross-sectional view of FIG. 2 taken along a line A-A.

FIG. 3(A) is a cross-sectional view of FIG. 2 taken along line A-A. As shown in FIG. 3(A), the opening 8c of the nozzle die 8b in the present embodiment is formed in a horizontally long rectangular shape. Thereby, the rubber extruder 3 can continuously extrude a rubber body (rubber strip) G1 having the substantially same cross-sectional shape (horizontally long rectangular shape) as the opening 8c of the nozzle die 8b.

When a thickness t1 and a width w1 of the rubber body G1 are small, molding accuracy may possibly decrease. Conversely, if the thickness t1 and the width w1 of the rubber body G1 are large, there is a tendency that the cross-sectional shape of the rubber member can not be shaped with a high degree of accuracy. Based on this perspective, the thickness t1 of the rubber body G1 is preferably not less than 0.4 mm, more preferably not less than 0.6 mm, and preferably not more than 3 mm, more preferably not more than 2 mm. Similarly, the width w1 of the rubber body G1 is preferably not less than 10 mm, more preferably not less than 20 mm, and preferably not more than 100 mm, more preferably not more than 90 mm. Needless to say, the diameters and the cross-sectional shape of the rubber body G1 is not limited to the above-mentioned ranges.

As shown in FIG. 2, the rubber body G1 continuously extruded by the rubber extruder 3 is transferred to a calender head 4. The calender head 4 is disposed on a downstream-side of the extrusion head 8. The calender head 4 has a pair of calender rollers 4a, 4b and a gap adjusting device 10.

The calender rollers 4a, 4b are arranged above and below to have a gap. The calender rollers 4a, 4b are supported rotatably by a frame main body 4c, respectively. The rotational axes of the calender rollers 4a, 4b are substantially paralleled. And at least one of the calender rollers 4a, 4b is rotary-driven by a second motor M2. The second motor M2 is controlled in the control unit 70.

The gap adjusting device 10 displaces the pair of the calender rollers 4a, 4b in an approximation direction or a separation direction. The gap adjusting device 10 has an actuator 11 such as a cylinder for a rectilinear operating, for example, and fixed in the upper part of the frame main body 4c. A rod of the actuator 11 is connected with the upper calender roller 4a. Therefore, when extending and retracting the rod of the actuator 11, the upper calender roller 4a can be moved up and down with respect to the frame main body 4c. Thereby, the upper and lower calender rollers 4a, 4b are able to change selectively between a rolling state for rolling the rubber body G1 with a predetermined gap, and a separation state where the gap is set to be larger than the predetermined gap and the rubber body G1 cannot be rolled. The actuator in the present embodiment is controlled by a fluid pressure, using a regulator composed of at least one of an electromagnetic valve, an electropneumatic proportional valve and the like (not shown), for example.

Figure 3B:
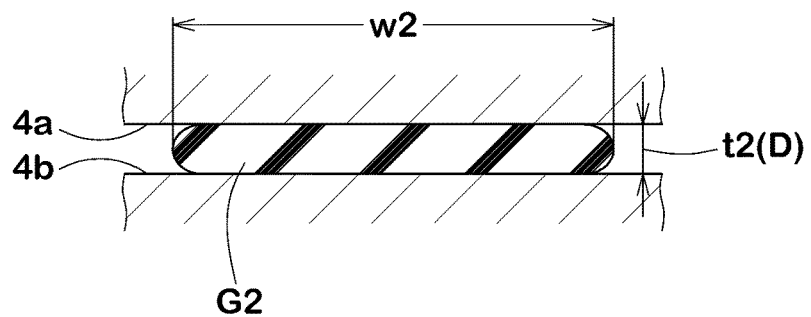
FIG. 3(B) is a cross-sectional view of FIG. 2 taken along a line B-B.

FIG. 3(B) is a cross-sectional view of the calender head 4 of FIG. 2 taken along the line B-B under the rolling state. The gap D between the calender rollers 4a, 4b is set to be smaller than the thickness t1 of the rubber body G1 (shown in FIG. 3(A)). Thereby, the rubber body G1 is rolled and shaped into a rubber strip G2 having a width w2 (>w1) and a thickness t2 (<t1).

In order to increase the accuracy of the cross-sectional shape of the rubber member, it is desirable to minimize the thickness t2 of the rubber strip G2 as far as stable rolling is possible. Based on this perspective, the thickness t2 of the rubber strip G2 is preferably not less than 0.3 mm, more preferably not less than 0.4 mm and preferably not more than 3 mm, more preferably not more than 2 mm. The width w2 of the rubber strip G2 is preferably not less than 5 mm, more preferably not less than 7 mm, and preferably not more than 100 mm, more preferably not more than 90 mm, much more preferably 50 mm. The rubber strip G2 in the present embodiment is molded to have the thickness t2 of 0.5 mm and the width w2 of 25 mm.

As shown in FIG. 1, the pulling rolls 12 exfoliate the rubber strip G2 extruded and molded by the calender head 4 from the calender rollers 4a, 4b (shown in FIG. 2) and pulls. As to the pulling rolls 12, it may be possible to provide one set of the pulling rolls. In the present embodiment, two sets having the same configuration are disposed in the rubber extracting direction (x) with a space left therebetween in order to preserve a stable exfoliating effectiveness. Both of the pulling rolls 12 rotate in the same direction so as to pull the rubber strip G2 in the downstream of the rubber extruding direction (x). These pulling rolls 12 are rotary-driven by a third motor M3. The third motor M3 is controlled in the control unit 70 (shown in FIG. 2).

On the downstream-side of the manufacturing device 1 for a rubber strip in the present embodiment, there are disposed a dancer roller 13, a rubber applicator 5, and a winding-around body 2, serially. Thereby, the manufacturing device 1 for a rubber strip in the present embodiment is able to compose a part of manufacturing device of the rubber member of the tire.

The dancer roller 13 is a rotatably free roller. The rubber strip G2 is wrapped on the dancer roller 13 in a U-shape. The dancer roller 13 moves freely up and down depending on its own weight and a tensile force of the rubber strip G2. Thereby, the rubber strip G2 extending between the dancer roller 13 and the rubber applicator 5 has a constant tension. Therefore, a deflection of the rubber strip G2 is prevented.

The rubber applicator 5 has a supporting rail 15 extending along the rubber extracting direction (x), a main body 16 disposed movably along the supporting rail 15, a up-and-down portion 17 being movable up and down along the main body 16, and a side frame 21 fixed in the up-and-down portion 17 via a support 18. The rubber applicator 5 is arranged closely to the dancer roller 13. Therefore, in the present embodiment, there is shown an aspect where no festoon (not shown) is provided between the rubber applicator 5 and the dancer roller 13.

Figure 4:
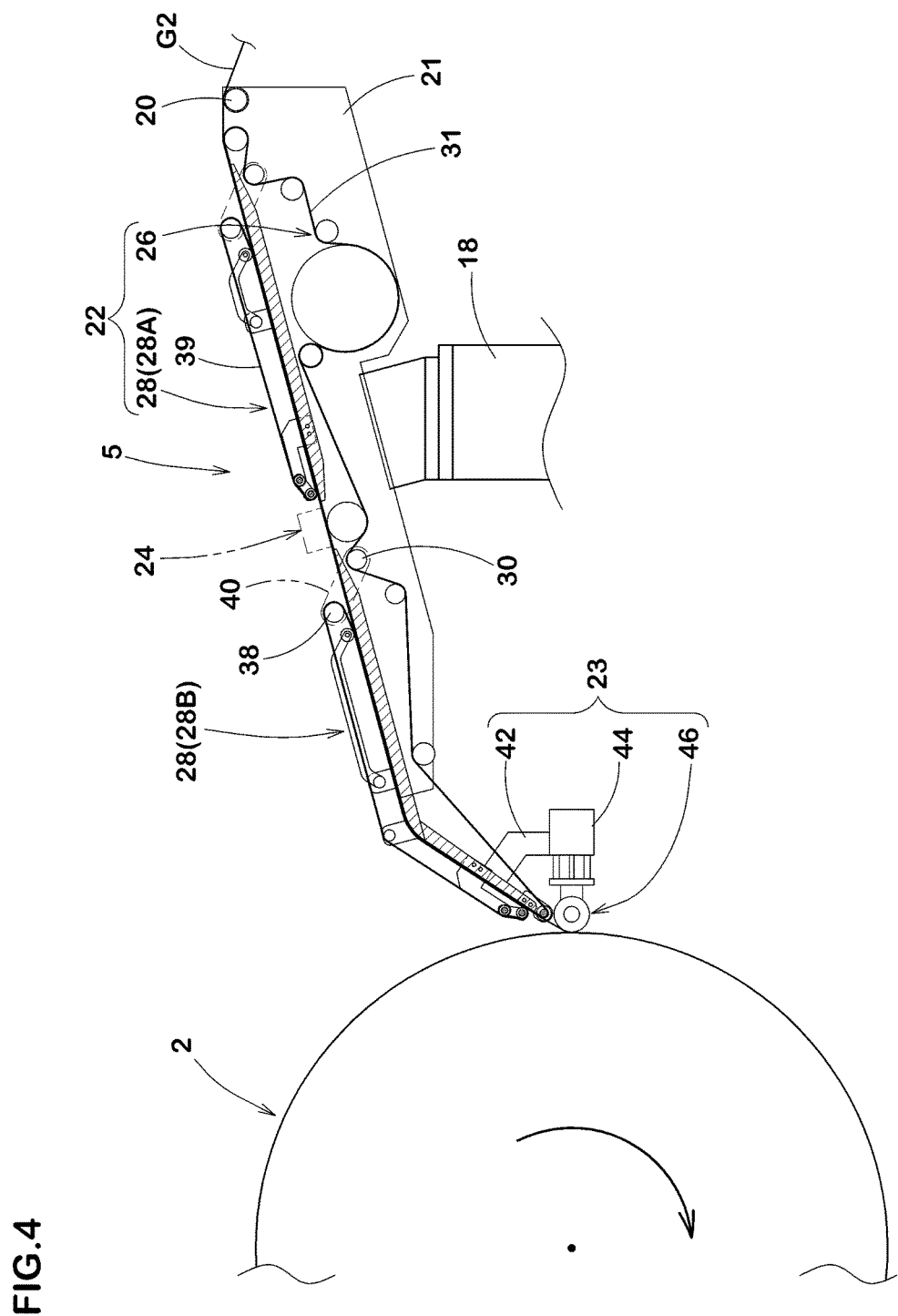
FIG. 4 is a partially enlarged view explaining a rubber applicator.

As shown enlargedly in FIG. 4, the side frame 21 has a guiding roller 20 disposed on an upstream-side, a conveyor portion 22 disposed on a downstream-side of it, a pasting portion 23 disposed on the downstream-side of the conveyor portion 22, and a cutting portion 24 disposed in the substantial center of the conveyor portion 22.

The guiding roller 20 is a rotatable roller having a horizontal axis and pivotally supported by the side frame 21. The rubber strip G2 is wrapped on the guiding roller 20. Between the guiding roller 20 and the dancer roller 13 (shown in FIG. 1), there is no other roller to receive the rubber strip G2.

The guide roller 20, for example, the outer diameter of the central portion in the axial direction is the largest, and the outer diameter is gradually reduced toward the outside in the axial direction, a so-called crown roller is preferably employed. Such crown roller can automatically correct a shifting or meandering of the rubber strip G2 and can guide the rubber strip G2 always at the largest diameter position of the roller. Therefore, the guiding roller 20 in the present embodiment can center the rubber strip G2 with a simple construction, and can supply it to the conveyor portion 22 on the downstream-side of the guiding roller 20.

The conveyor portion 22 in the present embodiment has a lower conveyor portion 26 and an upper conveyor portion 28, for example.

Figure 5:
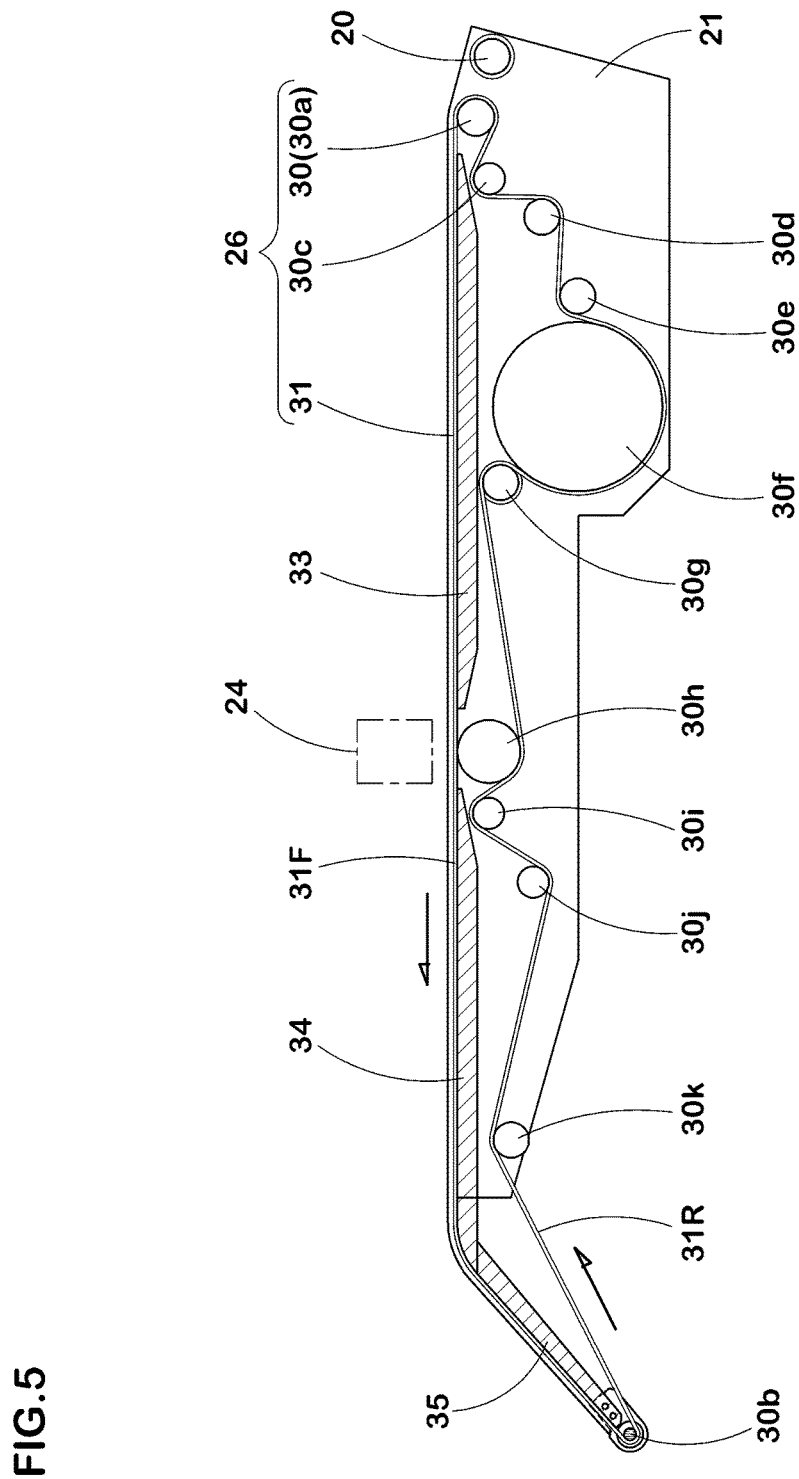
FIG. 5 is a cross-sectional view of a lower conveyor portion of FIG. 4.

As shown separately in FIG. 5, the lower conveyor portion 26 has a plurality of lower guiding rollers 30a, 30b . . . pivotally supported by the side frame 21 (when they are referred to generically, sigh 30 is used), and a conveying belt 31 guided by the lower guiding rollers 30 so as to be movable therearound.

The lower guiding roller 30 has at least a most-upstream roller 30a disposed in the uppermost-stream side of the conveying direction, a most-downstream roller 30b disposed in the downmost-stream side of the conveying direction, and a plurality of rollers 30c-30k disposed therebetween.

The conveying belt 31 runs in the outward-side region 31F for conveying the rubber strip G2 (shown in FIG. 4) from the position of a most-upstream roller 30a to the position of the most-downstream roller 30b and supplying it to the winding-around body 2 (shown in FIG. 4). The outward-side region 31F is set to be substantially flat at except an apical end of the downstream-side. After running in the outward-side region 31F, the conveying belt 31 turns back at the most-downstream roller 30b and runs in a homeward-side region 31R to return to the most-upstream roller 30a again.

The side frame 21 in the present embodiment is provided in the outward-side region 31F with backup plates 33, 34 and 35 to receive the underside of the conveying belt 31. These backup plates 33-35 suppress a downward flexure of the conveying belt 31, and it helps to keep the conveying belt 31 straight in the outward-side region 31F. Between the backup plate 33 and the backup plate 34, there is a space. The space is provided with the above-mentioned cutting portion 24 to cut the rubber strip G2. The cutting portion 24 will be discussed below.

As shown in FIG. 4, the upper conveyor portion 28 has an upstream-side upper conveyor portion 28A and a downstream-side upper conveyor portion 28B disposed on its downstream side. Between the upstream-side upper conveyor portion 28A and the downstream-side upper conveyor portion 28B, there is a space. As shown separately in FIG. 6, each of the upper conveyor portions 28A, 28B is provided with a pressing belt 39 guided in enabling go-around by a plurality of upper guiding rollers 38a, 38b . . . (when they are referred to generically, sigh 38 is used).

The upper guiding roller 38 of each of the upper conveyor portions 28A, 28B has a most-upstream-side roller 38a in the conveying direction, a most-downstream-side roller 38b in the conveying direction, and a roller 38c disposed therebetween. Each pressing belt 39 is wrapped around the most-upstream-side roller 38a and the most-downstream-side roller 38b, and execute a continuous go-around movement. Moreover, each of the upper conveyor portions 28A, 28B is provided with a pressing roller 38d to push down an inner periphery of the pressing belt 39, respectively. The pressing belt 39 is disposed so as to face to face with a conveying belt 31 (shown in FIG. 5).

As shown in FIG. 4, the conveyor portion 22 in the present embodiment has a connecting means 40. The connecting means 40 is a well-known means for transmitting a rotational force utilizing, for example, a chain, a belt, a sprocket, a gear or the like. For example, the connecting means 40 synchronizes any one of the lower guiding rollers 30 with any one of the upper guiding rollers 38. The synchronized lower guiding roller 30 and upper guiding roller 38 have the same outer diameters. Thereby, the conveying belt 31 of the lower conveyor portion 26 and the pressing belt 39 of the upper conveyor portion 28 are synchronized one another, and to be driven at the same speed.

The conveyor portion 22 composed the above, a tip of the rubber strip G2 is inserted between the lower conveyor portion 26 and the upstream-side upper conveyor portion 28A. In the conveyor portion 22, the rubber strip G2 is sandwiched between the conveying belt 31 of the lower conveyor portion 26 and the pressing belt 39 of the upper conveyor portion 28, and the rubber strip G2 can be conveyed by utilizing their frictional force. The conveyor portion 22 in such sandwich-type conveying system does not require self-bonding properties of the rubber strip G2 especially, therefore, stable conveying is possible without being affected by physical properties of the rubber strip G2.

A conveying speed V2 of the rubber strip by the conveyor portion 22 is desirably set in a range of from 70% to 100% of a supplying speed V1 of the rubber strip G2 from the calender head 4. The rubber strip G2 is conveyed without deflection between the dancer roller 13 and the conveyor portion 22.

As shown in FIG. 4, the pasting portion 23 works as a pressing means to press the rubber strip G2 transferred from the conveyor portion 22 on the rotating winding-around body 2, for example. The pasting portion 23 has a cylinder 44 and a pressing roller 46. The cylinder 44 is disposed on the downstream-side than the conveyor portion 22 via the frame 42 disposed in the side frame 21. The cylinder 44 has an extendable rod. The pressing roller 46 is attached rotatably to a rod apex of the cylinder 44. The pressing roller 46 can move closer to or away from the winding-around body 2 by the expansion or contraction of the rod of the cylinder 44.

Figure 7:
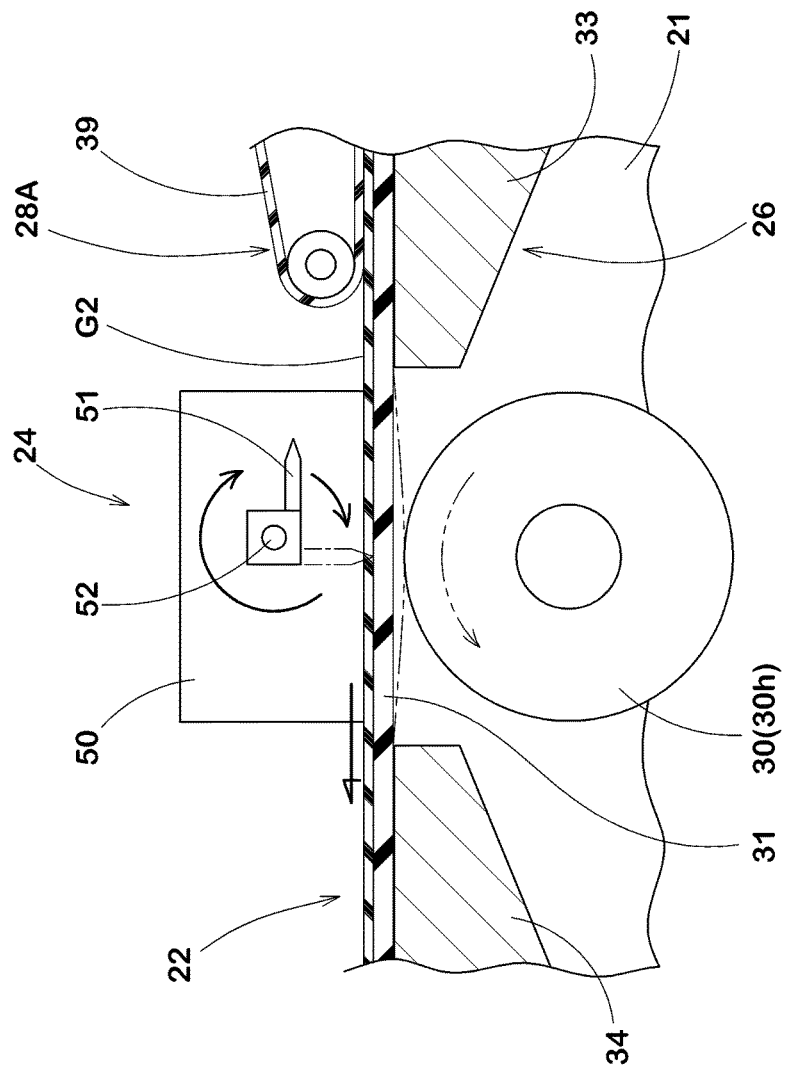
FIG. 7 is an enlarged view of a cutting portion.

As shown in FIG. 7 enlargedly, the cutting portion 24 has a bracket 50 extruding upward from the side frame 21; a rotational axis 52 being enabling rotary drive by a stepping motor (not shown) disposed in the bracket 50, for example; and a cutting blade 51 fixed to a rotational axis 52.

Figure 6:
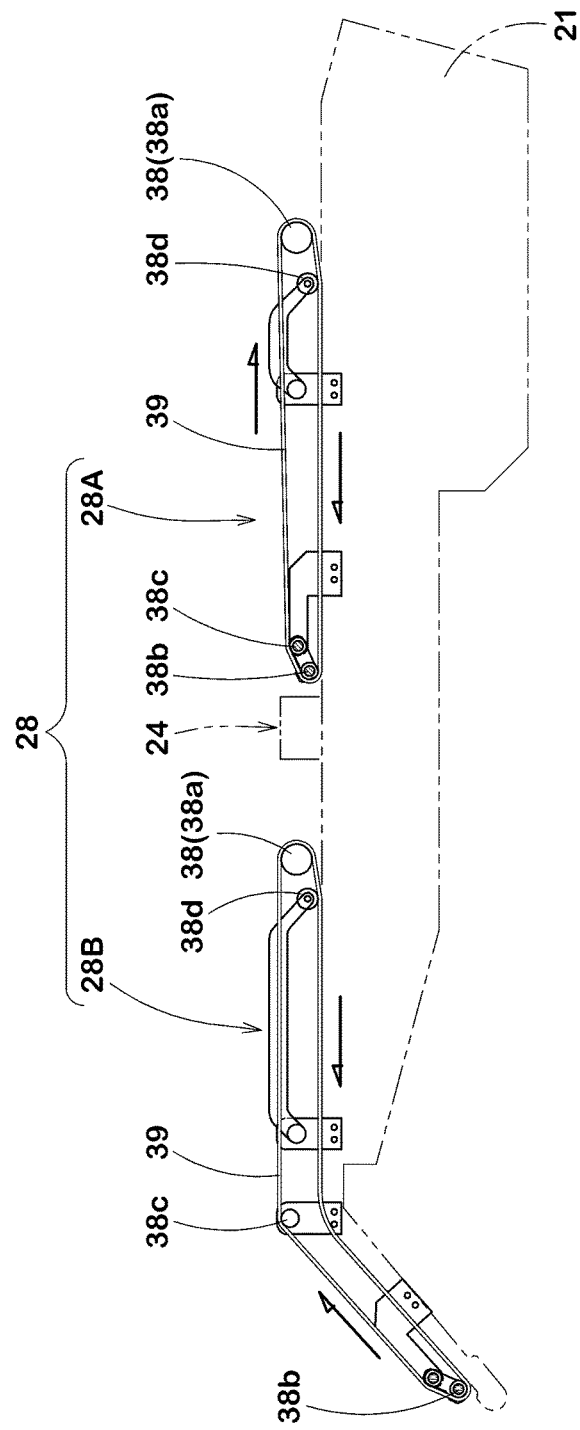
FIG. 6 is a cross-sectional view of an upper conveyor portion of FIG. 4.

As shown in FIG. 6, the cutting portion 24 is disposed between the upstream-side upper conveyor portion 28A and the downstream-side upper conveyor portion 28B. The cutting blade 51 may be a flat blade extending in the width direction of the rubber strip G2, for example, as shown in FIG. 7. Also, it may be a spiral blade (not shown) extending spirally around the rotational axis 52. It is desirable that the lower guiding roller 30 (30h) supports the underside of the conveying belt 31 pushed down by the cutting blade 51 so as to absorb a flexure and a shock.

As shown in FIG. 1, the winding-around body 2 in the present embodiment is configured as a cylindrical former 60. The former 60 is configured as a rigid inner mold whose outer surface has the shape of the inner circumferential surface of the finished tire to be formed. The inner mold is of a built-up type and is formed annularly by arranged the fan-shaped segments 60a. The former 60 is supported by the former supporter device 62 and rotary-driven.

The former supporter device 62 has a rail 64, a slide portion 66, a main portion 68, and a supporting portion 69. The rail 64 extends horizontally in the perpendicular direction to the rubber extracting direction (x). The main portion 68 is supported rotatably around a vertical z-axis with respect to the slide portion 66. The supporting portion 69 has a chuck portion extending upward from the main portion 68 and supporting the former 60 in a cantilever.

A function of the manufacturing device 1 for a rubber strip (including a manufacturing method of the rubber strip G2) formed in the above-mentioned composition will be described. A motor Ma of the rubber extruder main body 6 is driven, and the unvulcanized rubber is kneaded in the cylinder 6b.

Figure 8:
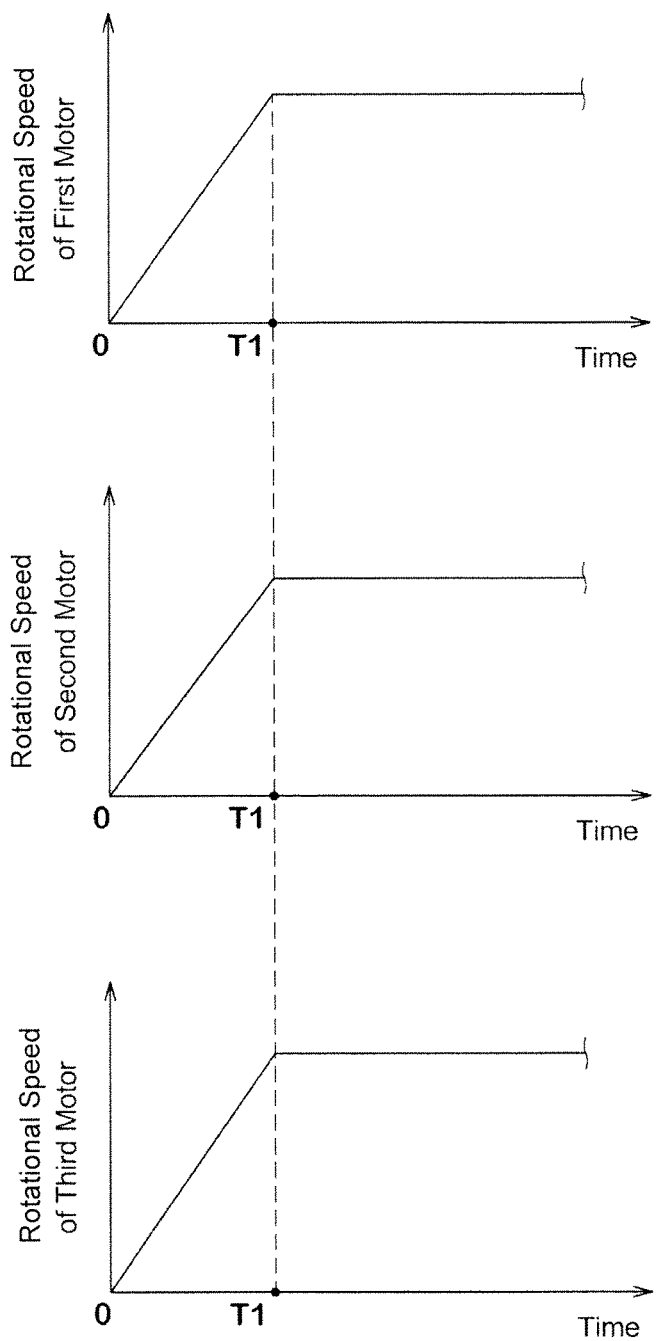
FIG. 8 is graphs showing relations between time and numbers of rotations the rotational speed of the first to third motors.
Figure 9:
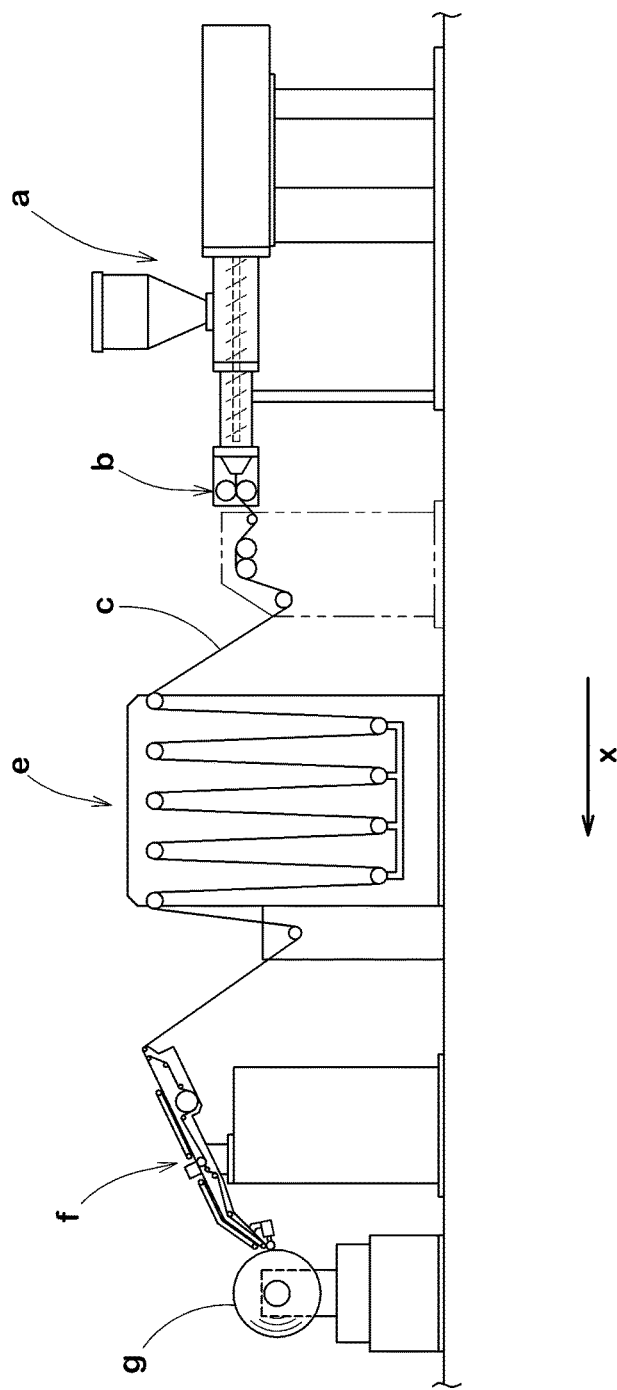
FIG. 9 is an overall side view of a conventional rubber strip manufacturing device.

As shown in FIG. 2, the control unit 70 drives the gear pump 7 of the rubber extruder 3 by starting the first motor M1 after reaching the rubber pressure on the inlet port side of the rubber chamber 7b to a predetermined value. In the uppermost part in FIG. 8, a graphs relations between time and a rotational speed of the first motor M1 is illustrated. The rotational speed of the first motor is controlled so as to become approximately-constant after linearly increasing from zero. Thereby, the rubber body G1 is extruded stably from the rubber extruder 3.

As shown in FIG. 2, the control unit 70 drives the second motor M2 with the drive of the first motor M1. The second motor M2 is controlled in conjunction with the first motor M1 for rotary-driving the gear pump 7. That is to say, as illustrated in a middle area of FIG. 8, the rotational speed of the second motor M2 is controlled so as to become approximately-constant at the substantially same time T1 after linearly increasing from zero. By this drive of the second motor M2, the calender rollers 4a, 4b of the calender head 4 are rotated. Thereby, the rubber body G1 is rolled and the rubber strip G2 is formed.

In a general way, in the gear pump 7, the rotational speed of the extrusion gear 7c is proportional to a discharging speed of the rubber body G1 extruded from it. In the present invention, the rotational speed of the calender rollers 4a, 4b change in conjunction with the rotational speed of the extrusion gear 7c of the gear pump 7, that is, a speed of supply of the rubber body G1.

According to the present invention, for example, when the discharging speed of the rubber body G1 from the gear pump 7 increases with the increase of the rotational speed of the first motor M1, the rotational speed of the calender rollers 4a, 4b also increases accordingly. Therefore, the rubber body G1 can be prevented from accumulating on the upstream-side of the calender roller 4a, and it is possible to avoid formation of the rubber strip G2, for example, having a larger width than a targeted value.

Conversely, when the rotational speed of the first motor M1 is decreased and the extrusion speed of the rubber body G1 from the gear pump 7 is decreased, the rotational speed of the calender rollers 4a, 4b is also decreased accordingly. Therefore, the rubber body can be prevented from stretching by the calender roller 4a, and it is possible to avoid formation of the rubber strip G2 having a larger width than a targeted value.

As shown in FIG. 2, the control unit 70 drives the third motor M3 with the drive of the first motor M1. Thereby, the pulling rolls 12 rotate and the rubber strip G2 is pulled from the calender rollers 4a, 4b. The third motor M3 is controlled in conjunction with the first motor M1 for rotary-driving the gear pump 7. That is to say, as illustrated in a lowermost part of FIG. 8, the rotational speed of the third motor M3 is also controlled so as to become approximately-constant at the substantially same time T1 after linearly increasing from zero.

According to the present invention, for example, when the discharging speed of the rubber body G1 from the gear pump 7 increases with the increase of the rotational speed of the first motor M1, not only the rotational speed of the calender rollers 4a, 4b but also the rotational speed of the pulling rolls 12 also increase accordingly. Therefore, the rubber strip G2 formed with high accuracy by the calender roller 4a can be pulled stably. In the present embodiment, a circumferential velocity of the pulling rolls 12 is set to be the same as or slightly larger than a circumferential velocity of the calender rollers 4a, 4b. Thereby, when the rubber strip G2 is pulled out from the calender rollers 4a, 4b, the rubber strip G2 can be prevented from being applied by a large tensile force, and the dimensionally-stable rubber strip G2 can be obtained uninterruptedly.

As shown in FIG. 1, the manufactured rubber strip G2 is supplied via the dancer roller 13 directly to a rubber applicator 5 without an intermediary such as festoon. In the rubber applicator 5, the rubber strip G2 is conveyed to the winding-around body 2 by the conveyor portion 22. One end of the rubber strip G2 is fixed onto the winding-around body 2 and wound spirally by rotating the winding-around body 2. Because the rubber strip G2 is dimensionally stable, by moving the former 60, the rubber member having various cross-sectional shapes can be formed with a high accuracy.

After winding the rubber strip G2 around the former 60, as shown in FIG. 7, the cutting portion 24 rotates the rotational axis 52 one revolution in the direction that synchronizes with the conveying direction of the rubber strip G2. Thereby, the cutting blade 51 can press the rubber strip G2 and the conveying belt 31. The rubber strip G2 and the conveying belt 31 which are pressed by the cutting blade 51, are sandwiched between the cutting blade 51 and the lower guiding roller 30. Thereby, the rubber strip G2 is cut. Meanwhile it is desirable that the circumferential velocity of the cutting blade 51 is the same as the speed of the rubber strip G2 conveying the conveyor portion 22. The timing of the cut of the rubber strip G2 is previously controlled by the control unit.

After the cut of the rubber strip G2 by the cutting portion 24, the conveyance of the conveyor portion 22, the operation of the gear pump 7 and the rotations of the calender rollers 4a, 4b are each immediately stopped. Thereby, balance of supply and demand of the rubber strip G2 between the rubber extruder 3 and the rubber applicator 5 is match.

However, it is desirable that the rubber extruder main body 6 (screw shaft 6c) keep its continuous operation without halting. This means that, the rubber is appropriately circulated in the cylinder 6b so as to maintain the high rubber pressure in the cylinder 6b during halting of the gear pump 7. Thereby, at the time of resuming the operation of the gear pump 7, the rubber can be immediately extruded in a fixed quantity.

With the rotations stopped, the calender rollers 4a, 4b preferably becomes a separation state. Meanwhile, when the rotations of the calender rollers 4a, 4b is halted under a state of rolling the rubber body G1, the rubber body G1 sandwiched therebetween is likely to occur creep. The creep reduces the thickness of the rubber body G1 by little and little and may be cut easily at the time of the resumption of operation. Especially, at the time of resuming the operation, the rubber body G1 is liable to be cut by a large stretching stress due to a subtle difference in the start timing between the calender head 4 and the rubber extruder 3.

Like the present embodiment, under halted state of the calender rollers 4a, 4b, by changing the upper lower calender rollers 4a, 4b into the separation state, the rubber body G1 exists therebetween can be released from a pressure by the upper and lower calender rollers 4a, 4b. Thereby, the thickness reduction of the rubber body G1 caused by the creep and the like can be reduced. Therefore, according to the present embodiment, at the time of terminating of operation, the cutoff of the rubber body G1 or the rubber strip G2 can be inhibited, and the stable and intermissive supply of the rubber strip G2 can be provided.

In the present embodiment, the former 60 after forming the rubber member is changed with another former 60. After the change of formers 60, the gap of the calender rollers 4a, 4b is changed to the rolling state, and the convey of the conveyor portion 22 and the operations of the gear pump 7, the calender rollers 4a, 4b and the pulling roll 12 are immediately restarted, respectively. The inside of the rubber chamber 7b of the gear pump 7 is filled with the rubber owing to the continuous operation of the rubber extruder main body 6. Therefore, at the same time as the restarting of operation, the gear pump 7 can supply the rubber body G1 stably.

Hereinbefore, the embodiment of the present invention was described, but it will be obvious that various changes may be made without limitation to what was described in the above.

The invention claimed is:

1. A rubber strip manufacturing device to manufacture a rubber strip made of unvulcanized rubber, comprising:

a rubber extruder, the rubber extruder comprising:
- a rubber extruder main body having a screw shaft for kneading and pushing the unvulcanized rubber toward an outlet opening, and
- a gear pump connected to the outlet opening of the rubber extruder main body and rotary-driven by a first motor;

a calender head comprising a pair of calender rollers for rolling a shaped rubber body extruded from the rubber extruder to obtain the rubber strip; and a control unit for controlling a second motor for rotary-driving the calender rollers in conjunction with the first motor, wherein said control unit controls a rotational speed of the second motor based on a rotational speed of the first motor, and wherein the rotational speed of the first motor and the rotational speed of the second motor are controlled so as to become approximately constant at a same time after linearly increasing from zero.

2. The rubber strip manufacturing device as set forth in claim 1, wherein, on a downstream-side of the calender head, a pulling roll for pulling the rubber strip rolled by the calender rollers is provided, and wherein the control unit controls a third motor for rotary-driving the pulling roll in conjunction with the first motor.

3. The rubber strip manufacturing device as set forth in claim 1, wherein the second motor is a single motor driving both rollers in the pair of calender rollers.

4. The rubber strip manufacturing device as set forth in claim 2, wherein the rotational speed of the first motor and the rotational speed of the third motor are controlled so as to become approximately constant at the same time after linearly increasing from zero.

* * * * *